US010953869B2

(12) United States Patent
Iio et al.

(10) Patent No.: US 10,953,869 B2
(45) Date of Patent: Mar. 23, 2021

(54) AUTOMATED DRIVING CONTROL DEVICE, VEHICLE, AND AUTOMATED DRIVING CONTROL METHOD

(71) Applicants: MITSUBISHI HEAVY INDUSTRIES, LTD., Tokyo (JP); MITSUBISHI JIDOSHA KOGYO KABUSHIKI KAISHA, Tokyo (JP)

(72) Inventors: Satoshi Iio, Tokyo (JP); Tetsuya Tomonaka, Tokyo (JP); Yusuke Kinouchi, Tokyo (JP); Yasuo Fujishima, Tokyo (JP); Kevin Walters, Tokyo (JP)

(73) Assignees: MITSUBISHI HEAVY INDUSTRIES, LTD., Tokyo (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 16/072,037

(22) PCT Filed: Feb. 1, 2017

(86) PCT No.: PCT/JP2017/003663
§ 371 (c)(1),
(2) Date: Jul. 23, 2018

(87) PCT Pub. No.: WO2017/135321
PCT Pub. Date: Aug. 10, 2017

(65) Prior Publication Data
US 2019/0039605 A1    Feb. 7, 2019

(30) Foreign Application Priority Data
Feb. 1, 2016    (JP) ............................. JP2016-017277

(51) Int. Cl.
*B60W 30/06*    (2006.01)
*G06T 1/00*    (2006.01)
(Continued)

(52) U.S. Cl.
CPC ......... *B60W 30/06* (2013.01); *B62D 15/0285* (2013.01); *G05D 1/0088* (2013.01);
(Continued)

(58) Field of Classification Search
CPC . B60W 30/06; B62D 15/0285; G05D 1/0088; G05D 1/0246; G05D 2201/0213;
(Continued)

(56) References Cited

U.S. PATENT DOCUMENTS 8,559,674 B2    10/2013  Uchida et al.
2007/0177011 A1  8/2007  Lewin et al.
(Continued)

FOREIGN PATENT DOCUMENTS

| CN | 101910781 | 12/2010 |
| EP | 2 610 778 | 7/2013 |
| JP | 2009-290788 | 12/2009 |

OTHER PUBLICATIONS

Partial European Search Report dated Jan. 23, 2019 in corresponding European Patent Application No. 17747476.4.
(Continued)

*Primary Examiner* — Aaron L Troost
(74) *Attorney, Agent, or Firm* — Wenderoth, Lind & Ponack, L.L.P.

(57) ABSTRACT

An automated driving control device includes a registration unit configured to generate automated driving information used for driving a vehicle automatically based on a first image obtained by capturing an environment around the vehicle in a mode of driver driving; and a control unit configured to automatically drive the vehicle based on the
(Continued)

automated driving information and a second image obtained by capturing the environment around the vehicle in a mode of automated driving. The registration unit includes an extraction unit configured to extract candidate feature points existing in the environment around the vehicle based on the first image; and a generation unit configured to select the candidate feature points that are determined to be structures fixed around a target position of the vehicle based on the first images captured while the vehicle moves, as feature points.

7 Claims, 12 Drawing Sheets

(51) Int. Cl.
  *B62D 15/02* (2006.01)
  *G08G 1/09* (2006.01)
  *G06T 7/00* (2017.01)
  *G08G 1/16* (2006.01)
  *G05D 1/00* (2006.01)
  *G05D 1/02* (2020.01)
(52) U.S. Cl.
  CPC .............. *G05D 1/0246* (2013.01); *G06T 1/00* (2013.01); *G06T 7/00* (2013.01); *G08G 1/09* (2013.01); *G08G 1/16* (2013.01); *G08G 1/168* (2013.01); *G05D 2201/0213* (2013.01)
(58) Field of Classification Search
  CPC ... G06T 7/00; G06T 1/00; G08G 1/09; G08G 1/16; G08G 1/168
  See application file for complete search history.

(56) References Cited

U.S. PATENT DOCUMENTS

| | | |
|---|---|---|
| 2009/0243889 A1 | 10/2009 | Suhr et al. |
| 2010/0226544 A1 | 9/2010 | Uchida et al. |
| 2013/0085637 A1* | 4/2013 | Grimm .................... G05D 1/00 701/25 |

OTHER PUBLICATIONS

International Search Report dated May 9, 2017 in International (PCT) Application No. PCT/JP2017/003663.
Office Action dated Oct. 10, 2020 in Chinese Patent Application No. 201780008933.7, with partial English translation of Search Report.

* cited by examiner

FIG.5

| | X COORDINATE | Y COORDINATE | Z COORDINATE |
|---|---|---|---|
| FEATURE POINT F2A | $X_{11}, X_{12}$ | $Y_{11}, Y_{12}$ | $Z_{11}, Z_{12}$ |
| FEATURE POINT F2B | $X_{21}, X_{22}$ | $Y_{21}, Y_{22}$ | $Z_{21}, Z_{22}$ |
| FEATURE POINT F2C | $X_{31}, X_{32}$ | $Y_{31}, Y_{32}$ | $Z_{31}, Z_{32}$ |
| FEATURE POINT F2D | $X_{41}, X_{42}$ | $Y_{41}, Y_{42}$ | $Z_{41}, Z_{42}$ |
| VEHICLE POSITION PA | $X_5$ | $Y_5$ | $Z_5$ |
| VEHICLE POSITION PB | $X_6$ | $Y_6$ | $Z_6$ |

AUTOMATED DRIVING INFORMATION

FIG.6

| | X COORDINATE | Y COORDINATE | Z COORDINATE |
|---|---|---|---|
| PRIORITY FEATURE POINT F3A | $X_{11}, X_{12}$ | $Y_{11}, Y_{12}$ | $Z_{11}, Z_{12}$ |
| PRIORITY FEATURE POINT F3B | $X_{21}, X_{22}$ | $Y_{21}, Y_{22}$ | $Z_{21}, Z_{22}$ |
| PRIORITY FEATURE POINT F3D | $X_{41}, X_{42}$ | $Y_{41}, Y_{42}$ | $Z_{41}, Z_{42}$ |

PRIORITY AUTOMATED DRIVING INFORMATION

AUTOMATED DRIVING CONTROL DEVICE, VEHICLE, AND AUTOMATED DRIVING CONTROL METHOD

FIELD

The present invention relates to an automated driving control device for a vehicle, a vehicle, and an automated driving control method.

BACKGROUND

General vehicle parking spaces are often narrow and it may be difficult to park vehicles, and in view of this, parking by automated driving has been highly desired. In the automated driving, conventionally, a parking target position is estimated by using, for example, an on-vehicle camera or the like and the vehicle is moved automatically to that parking target position. For example, Patent Literature 1 describes a technique of automated parking by recognizing a parking line expressing a parking section from image data from a camera, estimating a parking target position from the parking line, and performing automated parking.

CITATION LIST

Patent Literature

Patent Literature 1: Japanese Laid-open Patent Publication No. 2009-290788

SUMMARY

Technical Problem

However, in the technique according to Patent Literature 1, for example, it is necessary to capture a parking line, and the automated parking in a parking space without a parking line, for example in a house, has been impossible.

In view of the above, an object of the present invention is to provide an automated driving control device, a vehicle, and an automated driving control method, that can perform automated parking in a parking space without a parking line.

Solution to Problem

To solve the problem described above and achieve the object, an automated driving control device of the disclosure includes an automated driving information registration unit configured to generate automated driving information used for driving the vehicle automatically based on a registration time image serving as an image obtained by capturing an environment around the vehicle in a registration mode in which the vehicle is driven by a driver; and an automated driving control unit configured to automatically drive the vehicle based on the automated driving information and an automated driving time image serving as an image obtained by capturing the environment around the vehicle in an automated driving mode in which the vehicle is driven automatically. The automated driving information registration unit includes a candidate feature point extraction unit configured to extract candidate feature points existing in the environment around the vehicle based on the registration time image; and an automated driving information generation unit configured to select as feature points, the candidate feature points that are determined to be structures fixed around a target position of the vehicle among the candidate feature points based on a plurality of the registration time images captured while the vehicle moves, and generate the automated driving information indicating information regarding positions of the feature points relative to a predetermined origin coordinate. The automated driving control unit includes a vehicle position calculation unit configured to calculate vehicle position information indicating information regarding a position of the vehicle relative to the origin coordinate based on the automated driving time image and the automated driving information; and an automated driving execution control unit configured to automatically drive the vehicle to the target position based on the vehicle position information.

According to this automated driving control device, the position of the own vehicle in the automated driving can be calculated using a surrounding structure as a mark; therefore, even if the parking line to define the target position does not exist and the positional relation between the own vehicle and the parking position cannot be detected from the parking line, the automated parking is possible by the automated travel.

In the automated driving control device, it is preferable that the automated driving information generation unit determines that the candidate feature point a position of which in the registration time image satisfies a relation between the position of the candidate feature point and the position of the vehicle is a structure that is fixed, and selects that candidate feature point as the feature point. According to this automated driving control device, the structure that is suitably used as the mark can be detected as appropriate; therefore, the vehicle position in the automated driving can be calculated with higher accuracy.

In the automated driving control device, it is preferable that the automated driving information generation unit selects as the feature point, the candidate feature point that extends in a vertical direction among the candidate feature points. According to this automated driving control device, the structure can be detected with more certainty; therefore, the vehicle position in the automated driving can be calculated with higher accuracy.

In the automated driving control device, it is preferable that the automated driving information generation unit selects, as the feature point with priority, among the candidate feature points, the candidate feature point existing in a plurality of the registration time images that are successive in time series such that the vehicle has moved by a longer distance while the plurality of the registration time images are captured. According to this automated driving control device, one feature point can be used as the mark for a longer time; therefore, the vehicle position in the automated driving can be calculated more accurately in an appropriate level.

In the automated driving control device, it is preferable that the automated driving information generation unit includes a feature point selection unit configured to, based on a plurality of the registration time images captured while the vehicle moves, determine that the candidate feature point the position of which in the registration time image satisfies the relation between the position of the candidate feature point and the position of the vehicle is the structure that is fixed, and select that candidate feature point as the feature point; and a position estimation unit configured to, based on more registration time images in number than the registration time images used by the feature point selection unit, calculate information regarding the position of the feature point the position of which in the registration time image satisfies the relation between the position of the feature point and the position of the vehicle among the feature points, and generate the automated driving information indicating the information regarding the position of the feature point that satisfies the relation. According to this automated driving control device, the number of feature points to be calculated is reduced before the position estimation unit calculates the coordinate; therefore, the load of calculating the coordinate can be reduced.

In the automated driving control device, it is preferable that the automated driving information generation unit includes a feature point selection unit configured to select, as a priority feature point with priority, among the feature points, the feature point captured in a plurality of the registration time images that are successive in time series such that the vehicle has moved by a longer distance while the plurality of the registration time images are captured, and generate priority automated driving information indicating position information of the priority feature point relative to the origin coordinate based on the automated driving information, and the vehicle position calculation unit calculates the vehicle position information based on the automated driving time image and the priority automated driving information. According to this automated driving control device, one feature point can be used as the mark for a longer time; therefore, the vehicle position in the automated driving can be calculated more accurately in an appropriate level.

In the automated driving control device, it is preferable that the automated driving control unit includes a target position setting unit configured to generate target position information indicating information regarding a position of the target position relative to the origin coordinate, and an automated travel route generation unit configured to generate an automated travel route to the target position based on the vehicle position information and the target position information. According to this automated driving control device, the position of the own vehicle in the automated driving and the target position can be calculated as appropriate; therefore, the vehicle position in the automated driving can be calculated with higher accuracy.

In the automated driving control device, it is preferable that the automated travel route generation unit updates and generates the automated travel route every time the vehicle automatically travels by a predetermined distance or every time a predetermined period passes. According to this automated driving control device, the automated travel route can be set with higher accuracy by updating and generating the automated travel route.

To solve the problem described above and achieve the object, a vehicle of the disclosure includes the automated driving control device. According to this vehicle, the automated parking is possible by the automated travel even if the parking line does not exist.

To solve the problem described above and achieve the object, an automated driving control method of the disclosure includes an automated driving information registration step of generating automated driving information used for driving the vehicle automatically based on a registration time image serving as an image obtained by capturing an environment around the vehicle in a registration mode in which the vehicle is driven by a driver; and an automated driving control step of automatically driving the vehicle based on the automated driving information and an automated driving time image serving as an image obtained by capturing the environment around the vehicle in an automated driving mode in which the vehicle is driven automatically. The automated driving information registration step includes a candidate feature point extraction step of extracting candidate feature points existing in the environment around the vehicle based on the registration time image, and an automated driving information generation step of selecting as feature points, the candidate feature points that are determined to be structures fixed around a target position of the vehicle among the candidate feature points based on a plurality of the registration time images captured while the vehicle moves, and generating the automated driving information indicating information regarding positions of the feature points relative to a predetermined origin coordinate. The automated driving control step includes a vehicle position calculation step of calculating vehicle position information indicating information regarding a position of the vehicle relative to the origin coordinate based on the automated driving time image and the automated driving information, and an automated driving execution control step of automatically driving the vehicle to the target position based on the vehicle position information. According to this automated driving control method, the automated parking is possible by the automated travel even if the parking line does not exist.

Advantageous Effects of Invention

According to the present invention, the automated parking can be performed in the parking space without the parking line.

BRIEF DESCRIPTION OF DRAWINGS

FIG. 5 is a table expressing an example of automated driving information.

FIG. 6 is a table expressing an example of priority automated driving information.

DESCRIPTION OF EMBODIMENTS

Preferred Embodiments of the present invention will hereinafter be described in detail with reference to the attached drawings. Note that the present invention is not limited by the embodiments below, and if there is a plurality of embodiments, the embodiments can be implemented in combination.

First Embodiment

Figure 1:
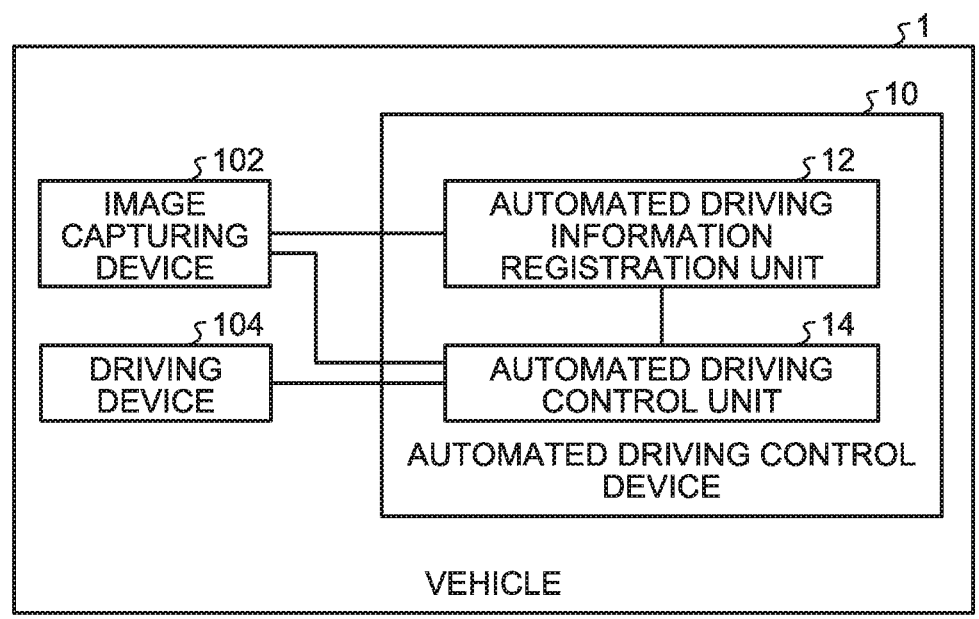
FIG. 1 is a block diagram illustrating a structure of a vehicle according to a first embodiment.

First, a first embodiment is described. FIG. 1 is a block diagram illustrating a structure of a vehicle according to the first embodiment. As illustrated in FIG. 1, a vehicle 1 according to the first embodiment includes an automated driving control device 10, an image capturing device 102, and a driving device 104. The vehicle 1 is an automobile, and is a passenger car in the present embodiment; however, the vehicle 1 is not limited to these and may be, for example, a commercial car. The vehicle 1 travels by being driven by the driving device 104 on the basis of a driver's driving operation. The vehicle 1 also travels automatically under control of the driving device 104 by the automated driving control device 10 without the driver's driving operation. The image capturing device 102 is a camera attached to the vehicle 1 to capture an image of an environment around the vehicle 1. The image capturing device 102 is attached to a rear part of the vehicle 1 and both sides of the vehicle 1; however, the present invention is not limited to this example and the image capturing device 102 may be attached to an arbitrary part such as a front part and the number of image capturing devices 102 may be either one or more than one.

As illustrated in FIG. 1, the automated driving control device 10 includes an automated driving information registration unit 12 and an automated driving control unit 14. The automated driving information registration unit 12 operates in a registration mode. The registration mode is a driving mode for generating automated driving information (priority automated driving information) for automatically driving the vehicle 1. In the registration mode, the vehicle 1 is driven by the driver. The automated driving information registration unit 12 generates the automated driving information for driving the vehicle 1 automatically on the basis of a registration time image Pi1 serving as an image of an environment around the vehicle 1 that is captured by the image capturing device 102 in the registration mode. The automated driving control unit 14 operates in an automated driving mode. The automated driving mode is a driving mode in which the vehicle 1 is driven automatically. In the present embodiment, the automated driving mode is a driving mode in which the vehicle 1 is driven automatically to a target position P0. The automated driving control unit 14 automatically drives the vehicle 1 by controlling the driving device 104 on the basis of an automated driving image Pi2 serving as an image of the environment around the vehicle 1 that is captured by the image capturing device 102 in the automated driving mode, and automated driving information (priority automated driving information). Note that it is the driver that performs mode setting to the registration mode and the automated driving mode.

Automated Driving Information Registration Unit

Figure 2:
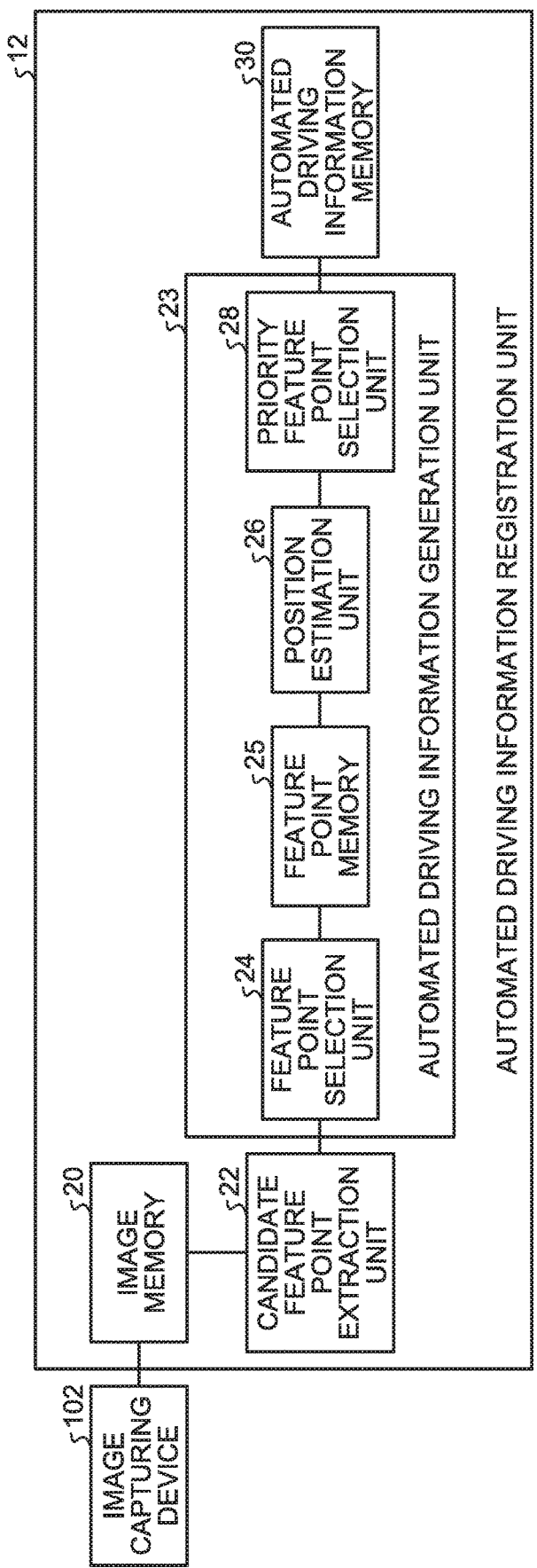
FIG. 2 is a schematic block diagram of an automated driving information registration unit according to the first embodiment.
Figure 3:
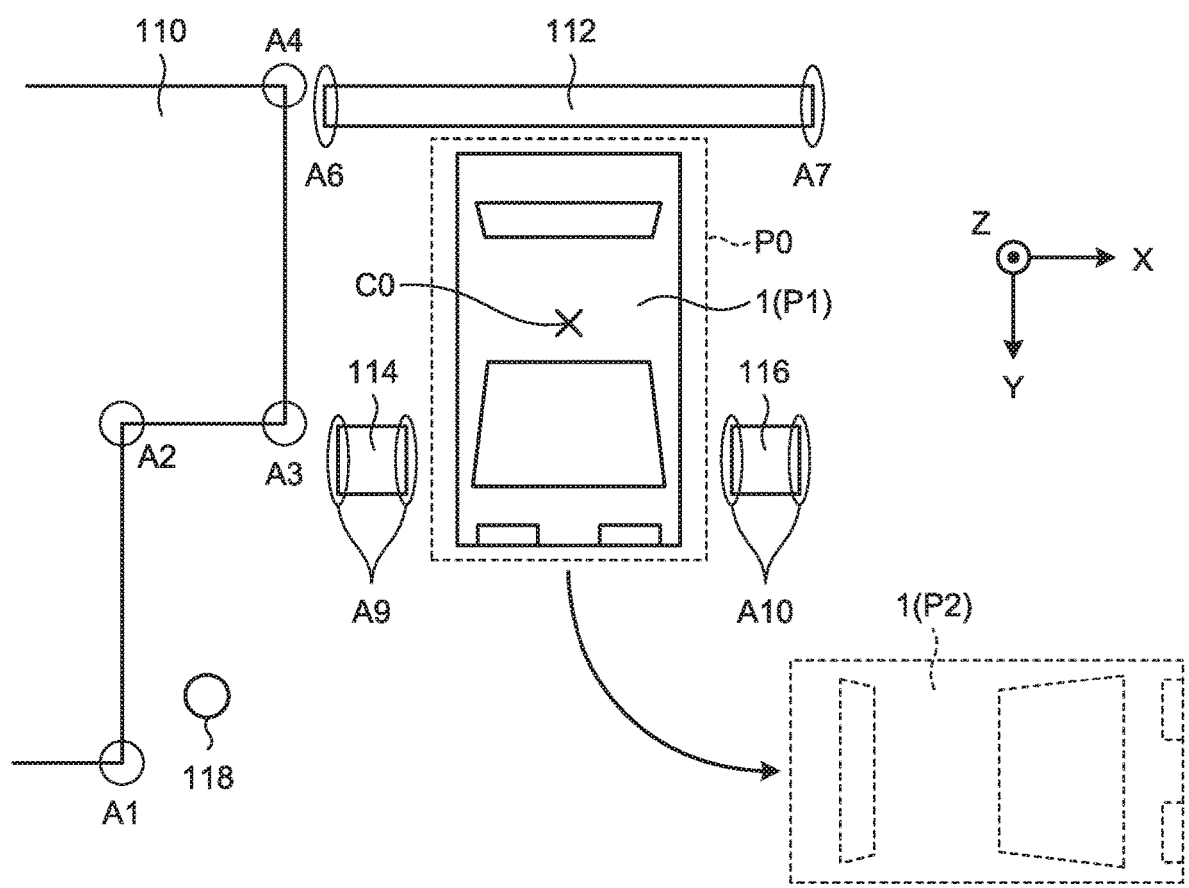
FIG. 3 is an explanatory view for describing an operation of the automated driving information registration unit.
Figure 4:
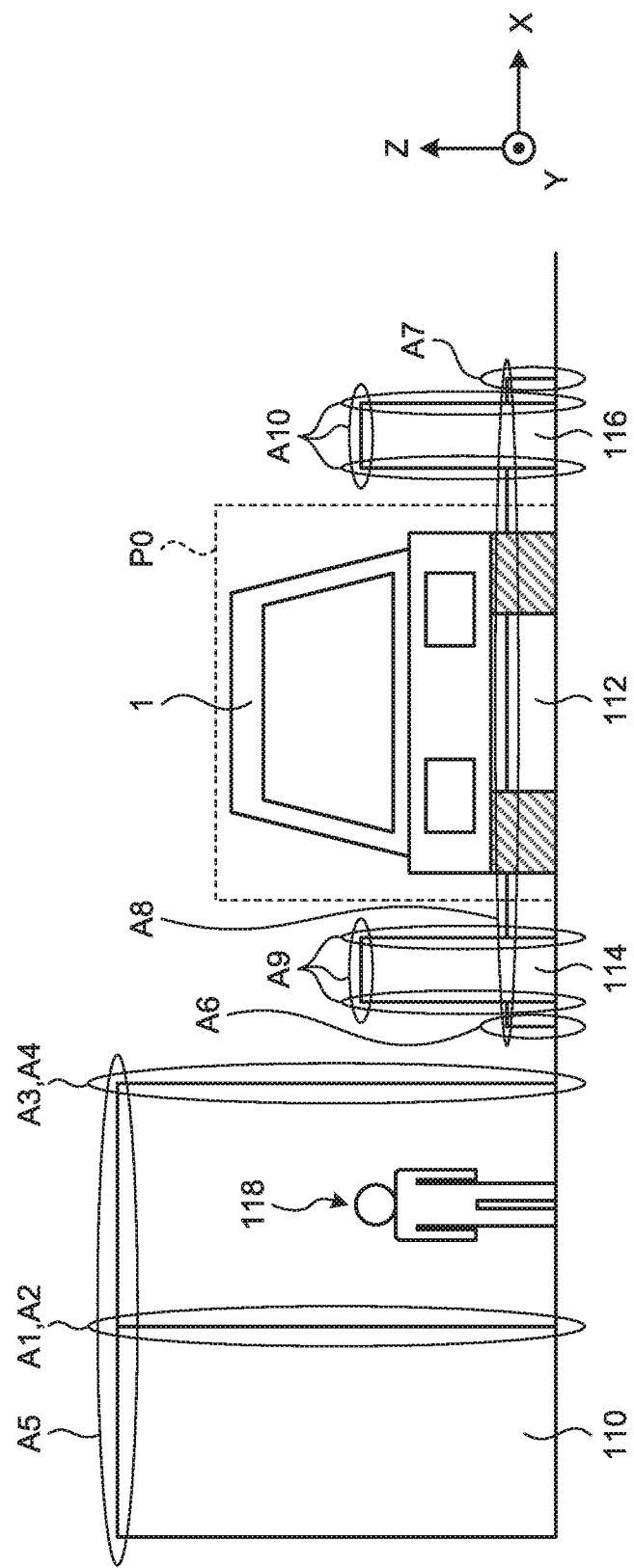
FIG. 4 is an explanatory view for describing the operation of the automated driving information registration unit.

Next, detailed description is made for a structure and an operation of the automated driving information registration unit 12. FIG. 2 is a schematic block diagram of the automated driving information registration unit according to the first embodiment. FIG. 3 and FIG. 4 are explanatory diagrams for describing an operation of the automated driving information registration unit. As illustrated in FIG. 2, the automated driving information registration unit 12 includes an image memory 20, a candidate feature point extraction unit 22, an automated driving information generation unit 23, and an automated driving information memory 30.

As described above, the automated driving information registration unit 12 operates in the registration mode. In the registration mode, the driver causes the vehicle 1 to move (exit) from the target position P0 to another place or move to (enter) the target position P0. Note that the target position P0 in the present embodiment is a parking space for the vehicle 1, and corresponds to a destination of the automated driving. FIG. 3 illustrates a case in which, in the registration mode, the driver causes the vehicle 1 to move from a position P1 to a position P2. The driver starts to drive after turning on the registration mode at the position P1, and after reaching the position P2, stops the registration mode. In the description below, the position P1 is the target position P0, that is, the driver causes the vehicle 1 to move (exit) from the target position P0 in the registration mode.

The image memory 20 is a memory (storage device) that obtains the registration time image Pi1 from the image capturing device 102 and stores the image therein. In the registration mode, the image capturing device 102 captures a plurality of the registration time images Pi1 serving as the images of the environment around the vehicle 1, for each position to which the vehicle 1 moves. In the registration mode, the image capturing device 102 may capture the registration time images Pi1 every time a predetermined period passes or every time the vehicle 1 moves by a predetermined distance. The image memory 20 obtains the registration time images Pi1 captured in the above manner; in other words, the image memory 20 can obtain the registration time images Pi1 captured at different positions.

The candidate feature point extraction unit 22 reads out the registration time images Pi1 from the image memory 20, and extracts candidate feature points F1. The candidate feature point F1 is a part of an object existing in the environment around the vehicle 1 in the registration time image Pi1. More specifically, the candidate feature point F1 is the point to become a candidate of a mark in the automated driving among objects existing around the target position P0. The candidate feature point extraction unit 22 extracts as the candidate feature points F1, all the positions that can be distinguished from the surroundings (for example, having contrast with the surroundings over a predetermined value). The candidate feature point extraction unit 22 extracts the candidate feature points F1 regarding all the registration time images Pi1. Detailed description will be made of the candidate feature points F1 with reference to FIG. 3 and FIG. 4.

As illustrated in FIG. 3 and FIG. 4, a wall 110, a block 112, columns 114 and 116, and a pedestrian 118 exist around the target position P0. Here, a direction X is a direction in parallel to a ground, a direction Y is a direction in parallel to the ground and orthogonal to the direction X, and a direction Z is a vertical direction that is perpendicular to the directions X and Y. The wall 110 is a structure that is adjacent to the target position P0 in the X direction, the block 112 is a structure that is adjacent to the target position P0 in the Y direction, and the columns 114 and 116 are structures that exist on both sides of the target position P0 in the X direction. The pedestrian 118 is a pedestrian who walks around the target position P0 at a timing when the registration time image Pi1 is captured, and does not correspond to a structure. The structure herein described refers to an object that is fixed on the ground, and the pedestrian 118, a vehicle, or the like that can move from that spot does not correspond to the structure.

As illustrated in FIG. 3 and FIG. 4, the candidate feature point extraction unit 22 extracts edge parts A1, A2, A3, A4, and A5 of the wall 110 as the candidate feature points F1.

The edge parts A1, A2, A3, A4, and A5 correspond to edges (corners or ends) of the wall 110, and have high contrast with the surroundings in the registration time image Pi1; thus, the edge parts A1, A2, A3, A4, and A5 are extracted as the candidate feature points F1. In addition, the candidate feature point extraction unit 22 extracts edge parts A6, A7, and A8 of the block 112 as the candidate feature points F1. The edge parts A6, A7, and A8 are similarly the points (edges) where the contrast with the surroundings is high. Moreover, the candidate feature point extraction unit 22 extracts an edge part A9 of the column 114 and an edge part A10 of the column 116 as the candidate feature points F1. The edge parts A9 and A10 are similarly the points (edges) where the contrast with the surroundings is high. Furthermore, the candidate feature point extraction unit 22 extracts the pedestrian 118 as the candidate feature point F1. Since the pedestrian 118 has a high contrast ratio with the surroundings, the pedestrian 118 is extracted as the candidate feature point F1.

As illustrated in FIG. 2, the automated driving information generation unit 23 includes a feature point selection unit 24, a feature point memory 25, a position estimation unit 26, and a priority feature point selection unit 28. In the automated driving information generation unit 23, the feature point selection unit 24 and the position estimation unit 26 select as feature points F2, the candidate feature points F1 that are determined to be the structures fixed around the target position P0 among the candidate feature points F1 on the basis of the registration time images Pi1. Then, the feature point selection unit 24 and the position estimation unit 26 generate the automated driving information as the information regarding the position of the feature point F2 relative to a predetermined origin coordinate. In addition, in the automated driving information generation unit 23, the priority feature point selection unit 28 selects priority feature points F3 from the feature points F2, and generates priority automated driving information indicating information regarding positions of the priority feature points F3 relative to the predetermined origin coordinate. After the registration mode is stopped, the automated driving information generation unit 23 starts to operate and generates the automated driving information. That is, the automated driving information generation unit 23 starts to operate after the vehicle 1 reaches the position P2 and all the registration time images Pi1 captured between the position P1 and the position P2 are stored in the image memory 20.

The feature point selection unit 24 selects as the feature points F2, the candidate feature points F1 that are determined to be structures fixed around the target position P0 among the candidate feature points F1. The feature point selection unit 24 stores the information regarding the selected feature points F2 (information indicating which candidate feature point F1 is the feature point F2) in the feature point memory 25.

The feature point selection unit 24 selects the feature points F2 on the basis of stereo photogrammetry. The stereo photogrammetry is described below. Specifically, the feature point selection unit 24 reads out a plurality of registration time images Pi1 (in the present embodiment, two registration time images Pi1) from the image memory 20, and associates the same candidate feature point F1 that commonly exists in those registration time images Pi1. In addition, the feature point selection unit 24 calculates a vehicle moving distance from the odometry information of the vehicle 1 (the moving amount of the vehicle 1 calculated based on the number of rotations of a motor or the number of rotations of a shaft, for example). The vehicle moving distance is a distance between the coordinate of the vehicle 1 when one registration time image Pi1 is captured and the coordinate of the vehicle 1 when the other registration time image is captured. The feature point selection unit 24 calculates temporary coordinate information of the associated candidate feature point F1 on the basis of the vehicle moving distance. The temporary coordinate information is the relative coordinate of the candidate feature point F1 relative to the coordinate of the vehicle 1 when the registration time image Pi1 is captured. When calculating the relative coordinate of the candidate feature point F1, the feature point selection unit 24 calculates the temporary coordinate information of only the candidate feature point F1 whose position in the registration time image Pi1 satisfies the relation between the coordinate of the vehicle 1 and the coordinate of the candidate feature point F1. In other words, the feature point selection unit 24 can select as the feature points F2 only the candidate feature points F1 whose positions satisfy the relation by the stereo photogrammetry, and calculate the temporary coordinate information of the selected feature points F2.

Here, when the relation is satisfied, a calculated position in a first image expressing the relation between the coordinate of the vehicle 1 and the coordinate of the candidate feature point F1 coincides with the position of a corresponding candidate feature point F1' in the actual registration time image Pi1 within a predetermined error range. More specifically, if it is assumed that the candidate feature point F1 exists at the calculated position of the temporary coordinate information and that the corresponding candidate feature point F1 at that position is captured from the coordinate of the vehicle 1 when the registration time image Pi1 is captured, the calculated position in the first image is the position of the corresponding candidate feature point F1' in the registration time image Pi1 (captured in the registration time image Pi1).

The feature point selection unit 24 selects the point that satisfies the relation in terms of stereo photogrammetry, as the feature point F2. Therefore, the candidate feature point F1 that is determined to be the structure that is fixed on the structure around the target position P0, that is, that does not move because of being fixed to that spot and will not change in shape over time can be selected as the feature point F2. The structure around the target position P0 herein described refers to not just a structure adjacent to the target position P0 but also a structure within a predetermined distance from the target position P0. In the example of FIG. 3 and FIG. 4, the feature point selection unit 24 determines the edge parts A1 to A10 of the wall 110, the block 112, and the columns 114 and 116 among the candidate feature points F1 to be the structures because those edges satisfy the relation in the stereo photogrammetry, and selects the edge parts as the feature points F2. On the other hand, the feature point selection unit 24 determines that the pedestrian 118 is not a structure because the pedestrian 118 moves during capture and does not satisfy the relation, and thus does not select the pedestrian 118 as the feature point F2. In this manner, by excluding the points whose positions do not satisfy the relation, the feature point selection unit 24 determines that the points that move or change in shape during the capture are not structures and does not select such points as the feature points F2.

In addition, the feature point selection unit 24 may select as the feature point F2, only the corresponding candidate feature point F1' that has a predetermined shape, for example, the candidate feature point F1' that extends in a vertical direction (direction Z) among the candidate feature points F1' that are determined to be the structure fixed on the ground. The feature point selection unit 24 determines whether the corresponding candidate feature point F1' has the predetermined shape (extends in the direction Z) on the basis of the temporary coordinate information of the corresponding candidate feature point F1'. The temporary coordinate information includes the information regarding the coordinate of one end of the corresponding candidate feature point F1' and the coordinate of the other end (for example, the coordinate of an upper end and the coordinate of a lower end of the edge part A1 in FIG. 4). Therefore, the feature point selection unit 24 can determine whether the corresponding candidate feature point F1' has the predetermined shape on the basis of the coordinates of the one end and the other end. If only the corresponding candidate feature point F1' that extends in the vertical direction is selected as the feature point F2, the feature point selection unit 24 determines that a mark, a scratch, and the like on the ground that do not extend in the vertical direction are not the feature point F2 and excludes them.

In addition, the feature point selection unit 24 may select the feature points F2 from the corresponding candidate feature points F1' that are determined to be the structures fixed on the ground on the basis of the visual feature of the corresponding candidate feature points F1' displayed in the registration time image Pi1. The visual feature of the corresponding candidate feature points F1' is the feature of the candidate feature point F1 that can be recognized from one registration time image Pi1, and is, for example, the shape or the color of the candidate feature point F1. Specifically, the feature point selection unit 24 selects as the feature point F2, the candidate feature point F1 that has a predetermined shape, for example, the candidate feature point F1 that extends in the vertical direction (direction Z) among the candidate feature points F1 that are determined to be the structures. In addition, the feature point selection unit 24 selects as the feature point F2 with priority, the candidate feature point F1 that has high contrast with the surroundings among the candidate feature points F1 that are determined to be the structures. For example, the feature point selection unit 24 extracts the candidate feature point F1 that extends in the vertical direction (direction Z) among the candidate feature points F1 in the same registration time image Pi1, and selects the extracted candidate feature point F1 as the feature point F2. The feature point selection unit 24 extracts a predetermined number of candidate feature points F1 among the candidate feature points F1 in the same registration time image Pi1 in the order from the highest contrast with the surroundings, and selects the extracted candidate feature points F1 as the feature points F2.

The position estimation unit 26 calculates automated driving information $\alpha 1$ on the basis of the registration time images Pi1. The automated driving information $\alpha 1$ includes information regarding the position of the feature point F2 relative to the origin coordinate C0, and information regarding the position for every movement of the vehicle 1 relative to the origin coordinate C0. The origin coordinate C0 is the coordinate of the origin in a world coordinate system. Therefore, the position of the feature point F2 relative to the origin coordinate C0 is the coordinate in the world coordinate system of the feature point F2. Then, the position for every movement of the vehicle 1 relative to the origin coordinate C0 is the coordinate in the world coordinate system for every movement of the vehicle 1. That is, the position estimation unit 26 is different from the feature point selection unit 24 in that the position estimation unit 26 calculates not the relative coordinate of the feature point F2 relative to the vehicle 1 but the absolute coordinate of the feature point F2. The position of the feature point F2 relative to the origin coordinate C0 is hereinafter referred to as a feature point coordinate C1, and the position of the vehicle 1 relative to the origin coordinate C0 is hereinafter referred to as a registration time vehicle coordinate C2. The registration time vehicle coordinate C2 includes a posture coordinate, in addition to the position coordinate. Note that the origin coordinate C0 in the present embodiment is a center coordinate of the target position P0 (the origin coordinate of the vehicle coordinate system when the vehicle is parked at the center coordinate) as shown in FIG. 3; however, the origin coordinate C0 is not limited to this coordinate and may be an arbitrary coordinate in the world coordinates, that is, a predetermined coordinate that is fixed.

The position estimation unit 26 calculates the automated driving information $\alpha 1$ by using a method of bundle adjustment. The bundle adjustment is described below. Specifically, the position estimation unit 26 reads out (at least three or more) registration time images Pi1 from the image memory 20, which are more in number than the registration time images Pi1 read by the feature point selection unit 24, and associates the same feature point F2 that is common in the registration time images Pi1. The position estimation unit 26 calculates the feature point coordinate C1 and the registration time vehicle coordinate C2 by using the method of bundle adjustment on the basis of the relative coordinate of the feature point F2 relative to the coordinate of the vehicle 1 in one registration time image Pi1, and the relative coordinate of the vehicle 1 relative to another registration time image Pi1. The position estimation unit 26 calculates the feature point coordinates C1 for all the feature points F2. In addition, the position estimation unit 26 calculates the registration time vehicle coordinate C2 for each registration time image Pi1, that is, the registration time vehicle coordinate C2 of the vehicle 1 for each timing of the capture of the registration time image Pi1. When calculating the feature point coordinate C1, the position estimation unit 26 calculates the feature point coordinate C1 of only the feature point F2 whose position in the registration time image Pi1 satisfies the relation between the coordinate of the vehicle 1 and the coordinate of the feature point F2.

Here, when the relation is satisfied, a calculated position in a second image expressing the relation between the coordinate of the vehicle 1 and the coordinate of the feature point F2 coincides with the position of the candidate feature point F2 in the actual registration time image Pi1 within a predetermined error range. More specifically, if it is assumed that the feature point F2 exists at the calculated position of the feature point coordinate C1 and that the feature point F2 at that position is captured from the registration time vehicle coordinate C2, the calculated position in the second image is the position of the feature point F2 in the registration time image Pi1 (captured in the registration time image Pi1).

The position estimation unit 26 registers as the automated driving information $\alpha 1$, the information regarding the feature point coordinate C1 of the feature point F2 calculated in this manner. In this manner, the position estimation unit 26 performs the process that is similar to the process performed by the feature point selection unit 24, that is, the process to select the structure from the viewpoint that only the feature point F2 whose position in the actual registration time image Pi1 satisfies the relation between the coordinate of the vehicle 1 and the coordinate of the feature point F2 is selected. However, since the position estimation unit 26 uses the bundle adjustment, the number of registration time images Pi1 used in selecting one feature point F2 is larger than that used by the feature point selection unit 24. Therefore, the position estimation unit 26 can calculate the absolute coordinate of the feature point F2, and the accuracy of selecting the feature point F2, that is, the accuracy of specifying the structure is higher than that of the feature point selection unit 24.

FIG. 5 is a table expressing an example of the automated driving information. As expressed in FIG. 5, the position estimation unit 26 calculates as the automated driving information α1, the feature point coordinate C1 of the feature point F2 determined to be registered as the automated driving information α1 and the registration time vehicle coordinate C2 for every movement of the vehicle 1. In the example of FIG. 5, the automated driving information α1 includes the following coordinates as the feature point coordinates C1: a coordinate $(X_{11}, Y_{11}, Z_{11})$ of one end of a feature point F2A and a coordinate $(X_{12}, Y_{12}, Z_{12})$ of the other end of the feature point F2A, a coordinate $(X_{21}, Y_{21}, Z_{21})$ of one end of a feature point F2B and a coordinate $(X_{22}, Y_{22}, Z_{22})$ of the other end of the feature point F2B, a coordinate $(X_{31}, Y_{31}, Z_{31})$ of one end of a feature point F2C and a coordinate $(X_{32}, Y_{32}, Z_{32})$ of the other end of the feature point F2C, and a coordinate $(X_{41}, Y_{41}, Z_{41})$ of one end of a feature point F2D and a coordinate $(X_{42}, Y_{42}, Z_{42})$ of the other end of the feature point F2D. For example, the coordinate of one end is the coordinate of an upper end of the edge part A1 and the coordinate of the other end is the coordinate of a lower end of the edge part A1 in FIG. 4. The automated driving information α1 includes as the registration time vehicle coordinates C2 for every movement of the vehicle 1, a registration time vehicle coordinate $(X_5, Y_5, Z_5)$ of a vehicle position PA and a registration time vehicle coordinate $(X_6, Y_6, Z_6)$ of a vehicle position PB. The table in FIG. 5 is one example.

The priority feature point selection unit 28 selects the priority feature point F3 from the feature points F2 registered as the automated driving information α1 on the basis of at least one of the registration time image Pi1 and the automated driving information α1. The priority feature point selection unit 28 generates priority automated driving information α2 indicating the information regarding the priority feature point F3 relative to the origin coordinate C0 on the basis of the automated driving information α1.

For example, when the feature point F2 exists in the registration time images Pi1 that are successive in time series and a distance by which the vehicle 1 has moved while the registration time images Pi1 are captured is long, the priority feature point selection unit 28 selects the feature point F2 with priority as the priority feature point F3. In other words, the priority feature point selection unit 28 selects the feature point F2 with high priority as the priority feature point F3 when the number of registration time images Pi1 in which the feature point F2 is captured successively is large. For example, the priority feature point selection unit 28 extracts a predetermined number of feature points F2 among the feature points F2 in the same registration time image Pi1 in the order from the largest number of registration time images Pi1 in which the feature point F2 is captured successively, and selects the extracted feature point F2 as the priority feature point F3.

The priority feature point selection unit 28 may select as the priority feature point F3 with priority, the feature point F2 that is positioned near the vehicle 1 among the feature points F2 registered as the automated driving information α1. The feature point F2 positioned near the vehicle 1 changes in position largely (position on image) between the successive registration time images Pi1 as the vehicle 1 moves. That is, as the vehicle 1 moves, the apparent relative position of the feature point F2 near the vehicle 1 relative to the vehicle 1 (position in the successive registration time images Pi1) moves more than the feature point F2 that is positioned farther from the vehicle 1. Therefore, by selecting the feature point F2 near the vehicle 1 as the priority feature point F3 in this manner, the automated driving can be performed using, as a mark, the priority feature point F3 that is highly sensitive to the movement of vehicle 1; thus, the accuracy of the automated driving can be improved.

The priority feature point selection unit 28 extracts only the information of the coordinate of the priority feature point F3 among the feature point coordinates C1 in the automated driving information α1, and generates the information as the priority automated driving information α2. FIG. 6 is a table expressing an example of the priority automated driving information. The example of FIG. 6 shows the priority automated driving information α2 in a case where the feature points F2A, F2B, and F2D among the feature points F2A, F2B, F2C, and F2D of the automated driving information α1 in FIG. 5 are selected as the priority feature points F3A, F3B, and F3D. The priority automated driving information α2 in FIG. 6 includes the information regarding the coordinates of the priority feature points F3A, F3B, and F3D.

The automated driving information memory 30 stores the priority automated driving information α2 generated by the priority feature point selection unit 28 (automated driving information generation unit 23).

Figure 7:
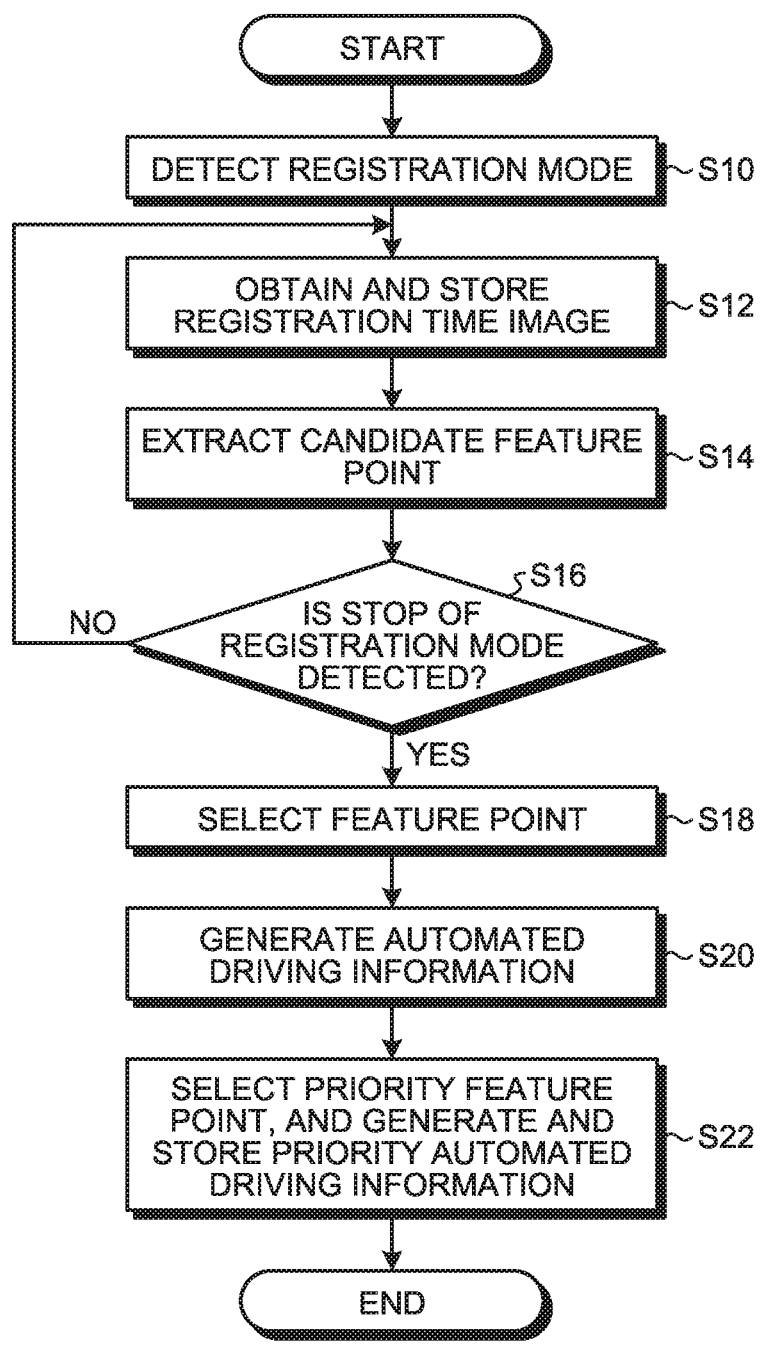
FIG. 7 is a flowchart for describing a process of generating the priority automated driving information according to the first embodiment.

The automated driving information registration unit 12 generates and stores the priority automated driving information α2 as described above. A process of generating the priority automated driving information α2 by the automated driving information registration unit 12 is described with reference to a flowchart. FIG. 7 is a flowchart for describing a process of generating the priority automated driving information according to the first embodiment. After the driver turns on the registration mode, the driver causes the vehicle 1 to move from the position P1 (here, target position P0) with the driver's own operation. In this operation, the image capturing device 102 sequentially captures the registration time images Pi1. As shown in FIG. 7, upon detection of the registration mode (setting of registration mode) by the automated driving information registration unit 12 (step S10), the image memory 20 obtains the registration time image Pi1 from the image capturing device 102 and stores the image therein (step S12). In the automated driving information registration unit 12, the candidate feature point extraction unit 22 reads out the registration time image Pi1 from the image memory 20, and extracts the candidate feature points F1 (step S14). The candidate feature point extraction unit 22 extracts as the candidate feature points F1, all the positions that can be distinguished from the surroundings among all the objects that exist around the target position P0 (for example, that have contrast with the surroundings over a predetermined value). After the candidate feature points F1 are extracted, the automated driving information registration unit 12 detects whether the registration mode is stopped (step S16), and if the registration mode is not stopped (No at step S16), the process returns to step S12, the next registration time image Pi1 is obtained, and the candidate feature point F1 in that registration time image Pi1 is extracted. Note that the candidate feature point F1 is preferably extracted as frequently as the registration time image Pi1 is captured. That is, the candidate feature point extraction unit 22 extracts the candidate feature point F1 of the registration time image Pi1 every time the registration time image Pi1 is captured.

If the registration mode is stopped (Yes at step S16), the feature point selection unit 24 in the automated driving information registration unit 12 selects the feature point F2 from the candidate feature points F1 on the basis of the registration time images Pi1 (step S18). The feature point selection unit 24 selects the feature point F2 corresponding to the candidate feature point F1 that satisfies the relation in terms of the stereo photogrammetry among the candidate feature points F1, and calculates the temporary coordinate information thereof. After selecting the feature point F2, the position estimation unit 26 in the automated driving information registration unit 12 generates the automated driving information α1 on the basis of the registration time image Pi1 and the information regarding the selected feature point F2 (step S20). The position estimation unit 26 calculates the feature point coordinate C1 of the feature point F2 that satisfies the relation in the bundle adjustment, and sets the calculated coordinate as the automated driving information α1.

After generating the automated driving information α1, the priority feature point selection unit 28 in the automated driving information registration unit 12 selects the priority feature points F3 from the feature points F2, and generates and stores the priority automated driving information α2 (step S22). When the feature point F2 exists in the registration time images Pi1 that are successive in time series and a distance by which the vehicle 1 has moved while the registration time images are captured is long, the feature point F2 is selected as the priority feature point F3 with priority. Then, the priority feature point selection unit 28 extracts only the information regarding the coordinate of the priority feature point F3 from the automated driving information α1, and generates the information as the priority automated driving information α2. The priority automated driving information α2 is stored in the automated driving information memory 30. By performing step S22, the process of calculating the priority automated driving information α2 by the automated driving information registration unit 12 is completed.

Regarding Automated Driving Control Unit

Figure 8:
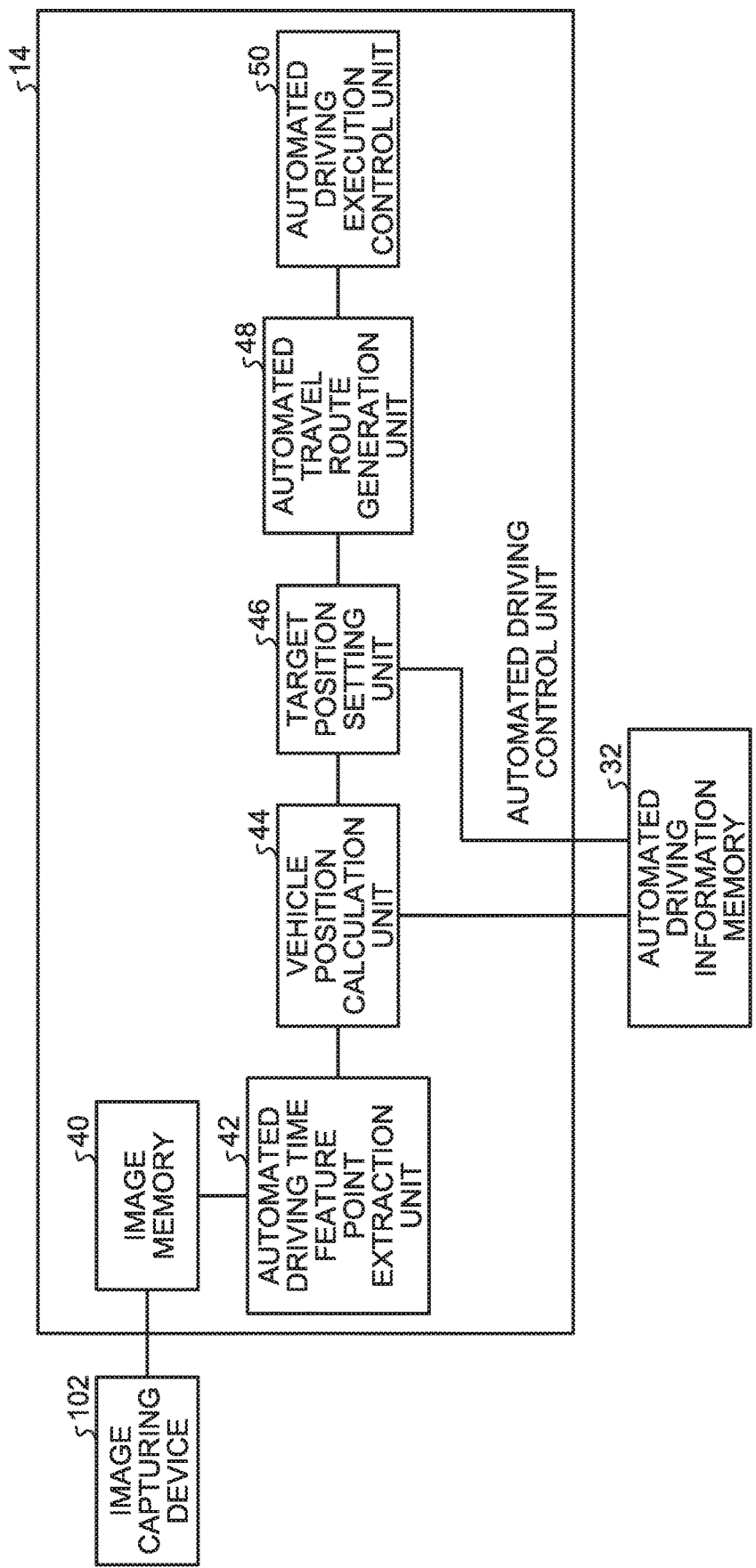
FIG. 8 is a schematic block diagram of an automated driving control unit according to the first embodiment.

Next, detailed description is made for a structure and an operation of the automated driving control unit 14 illustrated in FIG. 1. FIG. 8 is a schematic block diagram of the automated driving control unit according to the first embodiment. As illustrated in FIG. 8, the automated driving control unit 14 includes an image memory 40, an automated driving time feature point extraction unit 42, a vehicle position calculation unit 44, a target position setting unit 46, an automated travel route generation unit 48, and an automated driving execution control unit 50.

As described above, the automated driving control unit 14 operates in the automated driving mode. In the automated driving mode, the automated driving control unit 14 causes the vehicle 1 to travel automatically to the target position P0. The driver drives the vehicle 1 by himself to the surroundings of the target position P0 and turns on the automated driving mode from that position. If the automated driving is possible (if the automated travel route can be generated), the automated driving control unit 14 starts the automated driving and if the automated driving is not possible (if the automated travel route cannot be generated), the automated driving control unit 14 does not start the automated driving. Note that since the target position P0 is a parking space in the present embodiment, the automated driving control unit 14 performs automated entry into the parking space. If, however, the target position P0 is the place outside the parking space, the automated driving control unit 14 causes the vehicle 1 to exit from the parking space automatically to the target position P0 that is on the outside.

The image memory 40 is a memory (storage device) that obtains the automated driving time image Pi2 from the image capturing device 102 and stores the image therein. In the automated driving mode, the image capturing device 102 captures the registration time images Pi1 serving as the images of the environment around the vehicle 1, for each position to which the vehicle 1 moves by the automated travel. In the automated driving mode, the image capturing device 102 may capture the automated driving time image Pi2 every time a predetermined period passes or capture the automated driving time image Pi2 every time the vehicle 1 moves by a predetermined distance. The image memory 40 obtains the automated driving time images Pi2 captured in this manner; therefore, it can be understood that the image memory 40 obtains the automated driving time images Pi2 captured from different positions.

The automated driving time feature point extraction unit 42 reads out the automated driving time image Pi2 from the image memory 40, and extracts an automated driving time feature point F4. The automated driving time feature point F4 is a part of the object existing in the environment around the vehicle 1 in the automated driving time image Pi2. The automated driving time feature point extraction unit 42 extracts the automated driving time feature point F4 by a method similar to the method of the candidate feature point extraction unit 22. Note that the automated driving time feature point extraction unit 42 preferably extracts three or more automated driving time feature points F4 in one automated driving time image Pi2.

The vehicle position calculation unit 44 calculates vehicle position information α3 on the basis of the automated driving time image Pi2 and the automated driving information α1. The vehicle position information α3 is the information regarding the current position (automated driving time vehicle coordinate C3) of the vehicle 1 relative to the origin coordinate C0. Specifically, the vehicle position calculation unit 44 performs a process for calculating the automated driving time vehicle coordinate C3 assuming that the vehicle 1 is positioned at a predetermined temporarily decided coordinate C3'. The vehicle position calculation unit 44 sets an arbitrary coordinate as the temporarily decided coordinate C3'. The temporarily decided coordinate C3' is the coordinate of the vehicle 1 relative to the origin coordinate C0 and includes the position coordinate and the posture coordinate.

The vehicle position calculation unit 44 reads out the priority automated driving information α2, and calculates the position of the priority feature point F3 in the automated driving time image Pi2 (i.e., captured in the automated driving time image Pi2) when it is assumed that the priority feature point F3 is captured from the coordinate of the temporarily decided coordinate C3'. The position of the priority feature point F3 in the automated driving time image Pi2 calculated in this manner is hereinafter described as a calculated position in a third image. The vehicle position calculation unit 44 determines whether the position of the automated driving time feature point F4 in the image in the actual automated driving time image Pi2 coincides with the calculated position in the third image within a predetermined error range. In other words, the vehicle position calculation unit 44 determines whether the position of the automated driving time feature point F4 in the actual automated driving time image Pi2 satisfies the relation between the coordinate of the temporarily decided coordinate C3' of the vehicle 1 and the coordinate of the priority feature point F3. If the position satisfies the relation, the vehicle position calculation unit 44 sets the temporarily decided coordinate C3' as the current coordinate of the vehicle, that is, the automated driving time vehicle coordinate C3. If the relation is not satisfied, the vehicle position calculation unit 44 determines that the actual current coordinate of the vehicle (automated driving time vehicle coordinate C3) is not the temporarily decided coordinate C3', and newly sets the temporarily decided coordinate C3', and then repeats the similar process until the relation is satisfied.

The target position setting unit 46 generates target position information α4 as the information regarding the position of the target position P0 relative to the origin coordinate C0 (target position coordinate C4). The target position P0 is designated by the driver from among the positions (positions of the vehicle 1 at timings where the registration time images Pi1 are captured) on the route where the vehicle 1 has moved in the registration mode. In the present embodiment, the target position P0 is the parking space, and the automated parking into the parking space is described; however, for example, the target position P0 may be set to the place outside the parking space and the vehicle may be extracted automatically out of the parking space. The target position setting unit 46 reads out the target position coordinate C4 of the target position P0 designated by the driver, from the automated driving information memory 30 and generates the target position information α4. In the present embodiment, the target position coordinate C4 of the target position P0 coincides with the origin coordinate C0. However, the target position setting unit 46 can set an arbitrary position in the automated driving time image Pi2 as the target position P0. For example, in a case where the automated driving time image Pi2 is on a touch panel, the driver's touching of the automated driving time image Pi2 enables the target position setting unit 46 to set the touched position as the target position P0.

The automated travel route generation unit 48 generates the automated travel route to the target position P0 on the basis of the vehicle position information α3 and the target position information α4. Specifically, the automated travel route generation unit 48 generates the automated travel route for the automated travel from the automated driving time vehicle coordinate C3 (the current coordinate of the vehicle 1) to the target position coordinate C4 (the coordinate of the target position P0). More specifically, the automated travel route generation unit 48 generates the automated travel route so that the vehicle 1 during the automated travel does not collide with the priority feature point F3 also on the basis of the feature point coordinate C1. The automated driving execution control unit 50 controls the driving device 104 so that the vehicle 1 travels automatically on the route of the automated travel route.

Note that the automated travel route generation unit 48 updates and generates the automated travel route every time the vehicle 1 travels automatically by a predetermined distance or every time a predetermined period passes. For example, the image capturing device 102 captures more feature points F2 in the capture range as the vehicle 1 gets closer to the target position P0. Therefore, the accuracy of calculating the automated driving time vehicle coordinate C3 from the feature point coordinate C1 becomes higher as the vehicle 1 gets closer to the target position P0; therefore, the automated travel route generation unit 48 can increase the accuracy of the automated travel route as the vehicle 1 gets closer to the target position P0.

Figure 9:
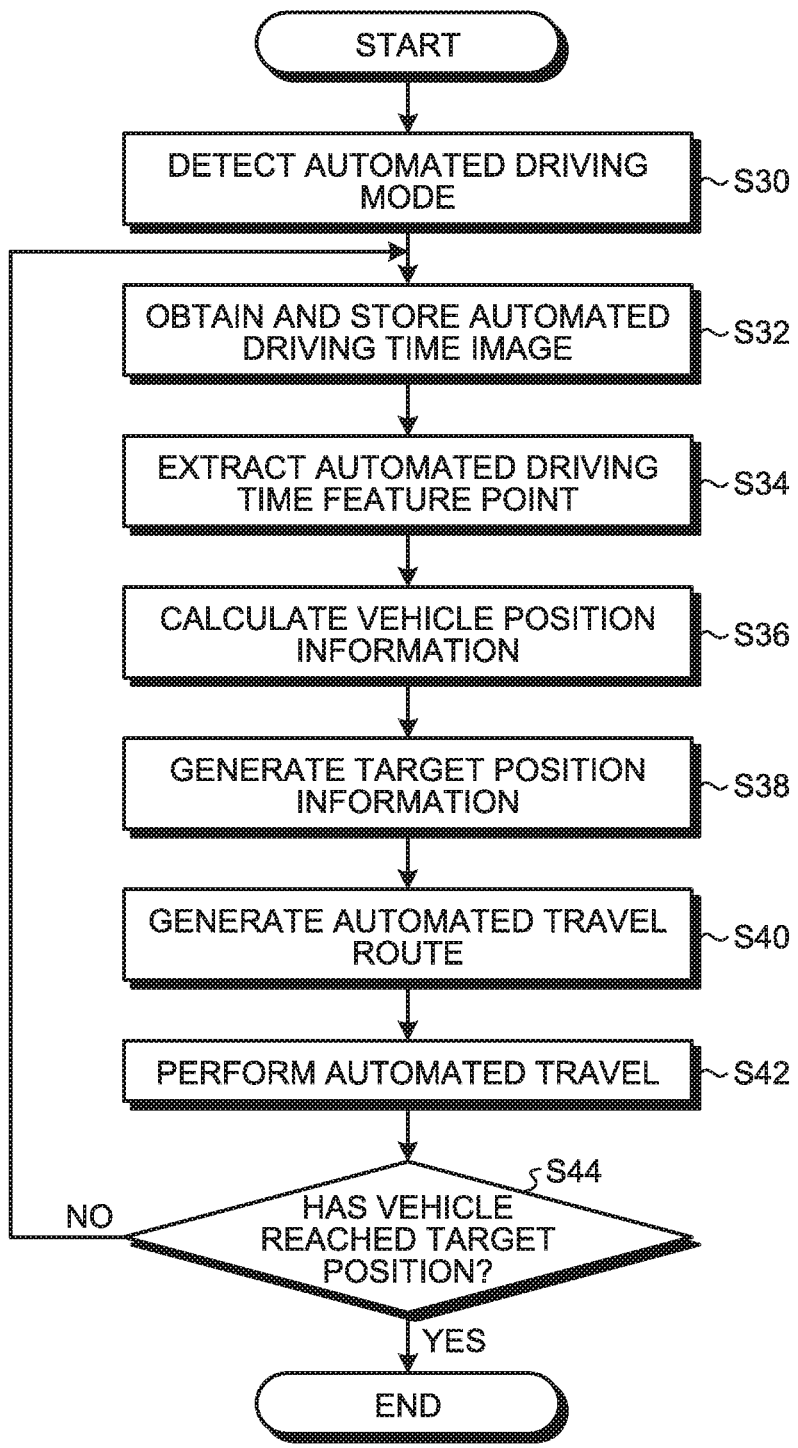
FIG. 9 is a flowchart for describing an automated travel control by an automated travel control unit according to the first embodiment.

The automated driving control unit 14 generates the automated travel route as described above, and causes the vehicle 1 to travel automatically on the automated travel route. Next, the automated travel control by the automated driving control unit 14 is described with reference to a flowchart. FIG. 9 is a flowchart for describing the automated travel control by the automated travel control unit according to the first embodiment. When the driver has turned on the automated driving mode, the image capturing device 102 starts to capture the automated driving time image Pi2. As shown in FIG. 9, upon the detection of setting of the automated driving mode (step S30), the image memory 40 in the automated driving control unit 14 obtains the automated driving time image Pi2 from the image capturing device 102 and stores the obtained image therein (step S32). After the automated driving time image Pi2 is obtained, the automated driving time feature point extraction unit 42 in the automated driving control unit 14 extracts the automated driving time feature point F4 in the automated driving time image Pi2 (step S34).

After the automated driving time feature point F4 is extracted, the vehicle position calculation unit 44 in the automated driving control unit 14 calculates the vehicle position information α3 on the basis of the automated driving time image Pi2 and the priority automated driving information α2 that is read out from the automated driving information memory 30 (step S36). If the position of the automated driving time feature point F4 in the actual automated driving time image Pi2 satisfies the relation between the temporarily decided coordinate C3' of the vehicle 1 and the coordinate of the priority feature point F3, the vehicle position calculation unit 44 sets the temporarily decided coordinate C3' as the current coordinate of the vehicle 1, that is, the automated driving time vehicle coordinate C3. The vehicle position information α3 includes the information regarding the automated driving time vehicle coordinate C3.

After the vehicle position information α3 is calculated, the target position setting unit 46 in the automated driving control unit 14 generates the target position information α4 indicating the information regarding the target position coordinate C4 (step S38), and the automated travel route generation unit 48 in the automated driving control unit 14 generates the automated travel route to the target position P0 on the basis of the vehicle position information α3 and the target position information α4 (step S40). After generating the automated travel route, the automated driving execution control unit 50 in the automated driving control unit 14 controls the driving device 104 to perform the automated travel on the automated travel route (step S42). In the automated travel, the automated driving control unit 14 determines whether the vehicle 1 has reached the target position P0 (step S44), and if the vehicle 1 has not reached the target position P0 (No at step S44), the process returns to step S32 and the latest automated driving time image Pi2 at that time is obtained. Then, on the basis of the automated driving time image Pi2, the similar process is performed to update the automated travel route. The automated driving control unit 14 causes the vehicle 1 to travel automatically on the updated automated travel route. The automated travel route is preferably updated as frequently as the automated driving time image Pi2 is captured. That is, every time the automated driving time image Pi2 is captured, the automated travel route generation unit 48 generates the automated travel route on the basis of the automated driving time feature point F4 that is newly extracted.

If the vehicle 1 has reached the target position P0 (Yes at step S44), the automated driving control unit 14 ends the automated travel process and stops the vehicle 1. Note that if an obstacle that is not stored in the automated driving information memory 30 exists on the automated route in the automated driving, the obstacle is detected with the image capturing device 102 or an ultrasonic sensor provided separately, and the automated travel route generation unit 48 generates the new automated travel route to avoid the obstacle.

As described above, the automated driving control device 10 according to the first embodiment includes the automated driving information registration unit 12 and the automated driving control unit 14. The automated driving information registration unit 12 includes the candidate feature point extraction unit 22 and the automated driving information generation unit 23. The candidate feature point extraction unit 22 extracts the candidate feature point F1 existing in the environment around the vehicle 1 on the basis of the registration time image Pi1. The automated driving information generation unit 23 selects as the feature point F2, the candidate feature point F1 that is determined to be the structure fixed around the target position P0 of the vehicle 1 among the candidate feature points F1 on the basis of the registration time images Pi1 captured while the vehicle 1 moves, and then generates the automated driving information $\alpha 1$ as the information regarding the position of the feature point F2 relative to the predetermined origin coordinate C0. The automated driving control unit 14 includes the vehicle position calculation unit 44 and the automated driving execution control unit 50. The vehicle position calculation unit 44 calculates the vehicle position information $\alpha 3$ indicating the information regarding the automated driving time vehicle coordinate C3 on the basis of the automated driving time image Pi2 and the automated driving information $\alpha 1$. The automated driving execution control unit 50 performs the automated driving of the vehicle 1 to the target position P0 on the basis of the vehicle position information $\alpha 3$.

In the registration mode that is executed before the automated driving mode, this automated driving control device 10 performs the travel to the target position P0 and at the same time, captures the registration time image Pi1 serving as the image around the target position P0. Then, on the basis of the registration time image Pi1, the automated driving information registration unit 12 calculates the position of the feature point F2 corresponding to the structure around the target position P0 (feature point coordinate C1). Then, the automated driving control device 10 captures the automated driving time image Pi2 in the automated driving mode. The automated driving control unit 14 detects the automated driving time feature point F4 around the vehicle 1 at the current time from the automated driving time image Pi2, and calculates the current position of the vehicle 1 (vehicle position information $\alpha 3$) on the basis of the position of the automated driving time feature point F4 and the position of the feature point F2 that is stored in advance (feature point coordinate C1). The automated driving control unit 14 sets the route to the destination from the current position of the vehicle 1 on the basis of the vehicle position information $\alpha 3$, and performs the automated driving to the destination. The automated driving control device 10 can calculate the coordinate of the structure (feature point F2) around the target position P0 in advance, and read out the coordinate of the structure in the surroundings in the automated driving. Therefore, this automated driving control device 10 can calculate the position (coordinate) of the own vehicle during the automated driving and the position (coordinate) of the target position P0 using the structure in the surroundings as a mark. Therefore, according to the automated driving control device 10, for example, even if the parking line that defines the target position P0 does not exist and the positional relation between the own vehicle and the parking position cannot be detected from the parking line, automated parking is possible by the automated travel.

In addition, since the structure is fixed around the target position P0, the possibility that the position changes or a subsequent image detection fails is low. The automated driving control device 10 selects as the feature point F2, the point determined to be the structure; therefore, it is possible to restrain the decrease in accuracy of calculating the vehicle position (vehicle position information $\alpha 3$) and to increase the accuracy of setting the route in the automated driving.

In addition, the automated driving information generation unit 23 selects as the feature point F2, the candidate feature point F1 whose position in the registration time image Pi1 satisfies the relation between the coordinate of the vehicle 1 and the coordinate of the candidate feature point F1. The relation between the coordinate of the vehicle 1 and the coordinate of the candidate feature point F1 is at least one of the calculated position in the first image that is calculated by the feature point selection unit 24 and the calculated position in the second image that is calculated by the position estimation unit 26. If the position of the candidate feature point F1 in the registration time image Pi1 does not satisfy the calculated coordinate, that is, if the candidate feature point F1 in the registration time image Pi1 does not exist at a position unmistakably determined by the coordinate, the automated driving information generation unit 23 determines that this candidate feature point F1 is not a structure and does not select this candidate feature point F1 as the feature point F2. Therefore, this automated driving control device 10 can detect appropriately the structure that is suitably used as the mark; thus, the vehicle position (vehicle position information $\alpha 3$) can be calculated with higher accuracy.

In addition, the automated driving information generation unit 23 selects as the feature point F2, the candidate feature point F1 that extends in the vertical direction (direction Z) from among the candidate feature points F1. The candidate feature point F1 that extends in the vertical direction is more suitably used as the mark in the automated driving because it is highly likely that such a point is the fixed structure. Therefore, by selecting the candidate feature point F1 that extends in the vertical direction as the feature point F2 and not selecting the candidate feature point F1 that does not extend in the vertical direction (such as a scratch or a mark on the ground) as the feature point F2, the structure that is suitably used as the mark can be detected appropriately and the vehicle position (vehicle position information $\alpha 3$) can be calculated with higher accuracy. Extending in the vertical direction is preferably extending straight in the vertical direction; however, the candidate feature point F1 may extend intersecting from the vertical direction as long as it extends by a predetermined length or more to the vertical direction. That is, the automated driving information generation unit 23 may select as the feature point F2, the candidate feature point F1 in which the distance between the Z coordinate of one end of the candidate feature point F1 and the Z coordinate of the other end is a predetermined length or more. This predetermined length can be set as appropriate, and is preferably the length of such a degree that the height can be recognized from the image.

When the candidate feature point F1 exists in the registration time images Pi1 that are successive in time series and a distance by which the vehicle 1 has moved while the registration time images Pi1 are captured is long, the automated driving information generation unit 23 selects the candidate feature point F1 as the feature point F2 with priority. In this case, the selected feature point is captured for a longer period in the automated driving time images Pi2. Therefore, the automated driving control device 10 can use one feature point as the mark for a longer period. As a result, the automated driving control device 10 can calculate the vehicle position in the automated driving (vehicle position information α3) with higher accuracy.

The automated driving information generation unit 23 includes the feature point selection unit 24 and the position estimation unit 26. On the basis of a plurality of the registration time images Pi1, the feature point selection unit 24 determines that the candidate feature point F1 whose position in the registration time image Pi1 satisfies the relation between the position of the candidate feature point F1 and the position of the vehicle 1 is a structure that is fixed, and selects that candidate feature point F1 as the feature point F2. On the basis of more registration time images in number than the registration time images used by the feature point selection unit 24, the position estimation unit 26 calculates the information regarding the position of the feature point F2 whose position in the registration time image Pi1 satisfies the relation between the position of the feature point F2 and the position of the vehicle 1 among the feature points F2, and generates the automated driving information α1 indicating information regarding the position of the feature point F2 that satisfies the relation.

On the basis of more registration time images Pi1 in number than the registration time images Pi1 used by the feature point selection unit 24, the position estimation unit 26 determines whether the relation is satisfied, that is, determines whether the feature point F2 is a structure. Therefore, the accuracy of determining whether the feature point F2 is a structure by the position estimation unit 26 is higher than that by the feature point selection unit 24. On the other hand, the load of calculating the coordinates in the position estimation unit 26 is higher than that in the feature point selection unit 24. In the first embodiment, however, the feature point selection unit 24 reduces the number of feature points F2 to be calculated before the position estimation unit 26 calculates the coordinate; therefore, the structure can be selected with higher accuracy while the load of calculating the coordinates is reduced.

The automated driving information generation unit 23 includes the priority feature point selection unit 28. When the feature point F2 is captured in a plurality of the registration time images Pi1 that are successive in time series and a distance by which the vehicle 1 has moved while the registration time images Pi1 are captured is long, the priority feature point selection unit 28 selects the feature point F2 as the priority feature point F3 with priority, and generates the priority automated driving information α2 indicating position information of the priority feature point F3 relative to the origin coordinate C0. The vehicle position calculation unit 44 calculates the vehicle position information α3 on the basis of the automated driving time image Pi2 and the priority automated driving information α2. In the calculation of the vehicle position information α3, the priority feature point selection unit 28 uses as the priority feature point F3, the feature point F2 that can be used as the mark for a longer period. Therefore, the automated driving control device 10 can calculate the vehicle position in the automated driving (vehicle position information α3) more accurately in an appropriate level.

Furthermore, the automated driving control unit 14 includes the target position setting unit 46 that generates the target position information α4 indicating the information regarding the target position coordinate, and the automated travel route generation unit 48 that generates the automated travel route to the target position P0 on the basis of the vehicle position information α3 and the target position information α4. Since this automated driving control device 10 can calculate the position (coordinate) of the own vehicle in the automated driving and the position (coordinate) of the target position P0 appropriately, the route in the automated driving can be set with higher accuracy. In addition, since this automated driving control device 10 calculates the position (coordinate) of the own vehicle and the position (coordinate) of the target position P0, not the route that is stored in advance but a new route that connects between the position of the own vehicle and the target position P0 can be set. Therefore, the automated driving control device 10 can perform flexible automated driving, such as entering the target position P0 or exiting from the target position P0.

The automated travel route generation unit 48 updates and generates the automated travel route every time the vehicle 1 automatically travels by a predetermined distance or every time a predetermined period passes in the automated travel. The accuracy of calculating the automated driving time vehicle coordinate C3 (the current position of the vehicle 1) is higher as the vehicle 1 gets closer to the target position P0; therefore, updating and generating the automated travel route can increase the accuracy of setting the automated travel route.

Figure 10:
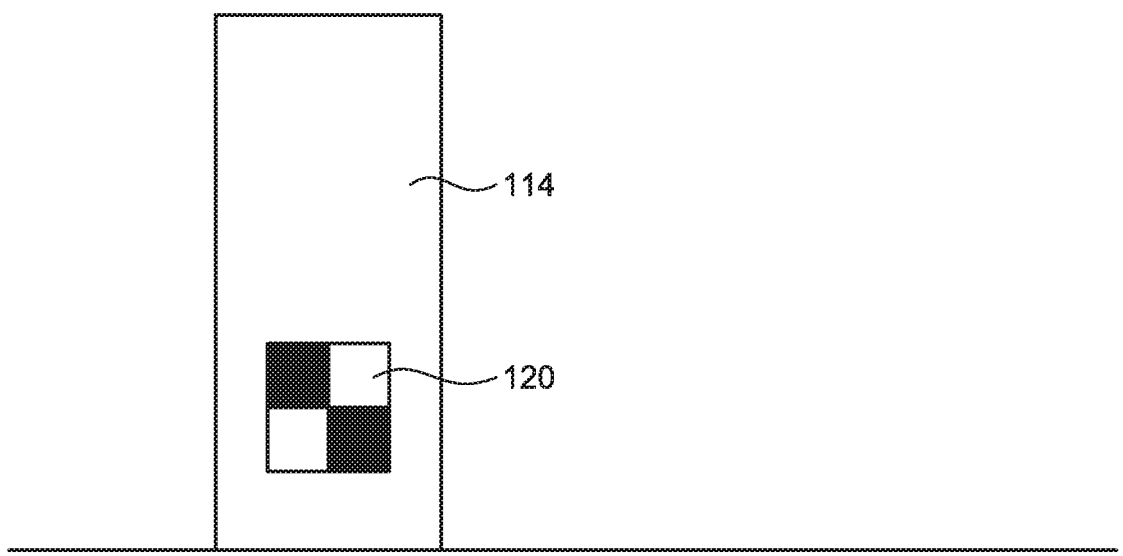
FIG. 10 is a diagram for describing a case in which a structure is given a mark.

FIG. 10 is a diagram for describing a case in which a structure is given a mark. In a case where the vehicle 1 is caused to automatically enter or exit from a predetermined place, such as a parking space at home, by using the automated driving control device 10, a mark 120 that is easily detected as the feature point F2 may be given to a structure around the parking space. In the example of FIG. 10, the mark 120 is given to the column 114. The mark 120 preferably has a high contrast ratio, such as a mark in a combination of white and black.

The automated driving information generation unit 23 according to the first embodiment includes the feature point selection unit 24, the position estimation unit 26, and the priority feature point selection unit 28; however, it is only necessary that the automated driving information generation unit 23 includes at least the position estimation unit 26. Such embodiments will be described below.

Second Embodiment

An automated driving control device 10a according to a second embodiment is different from the first embodiment in that an automated driving information registration unit 12a does not include the feature point selection unit 24. Description of a part of the second embodiment that is common to the first embodiment is omitted.

Figure 11:
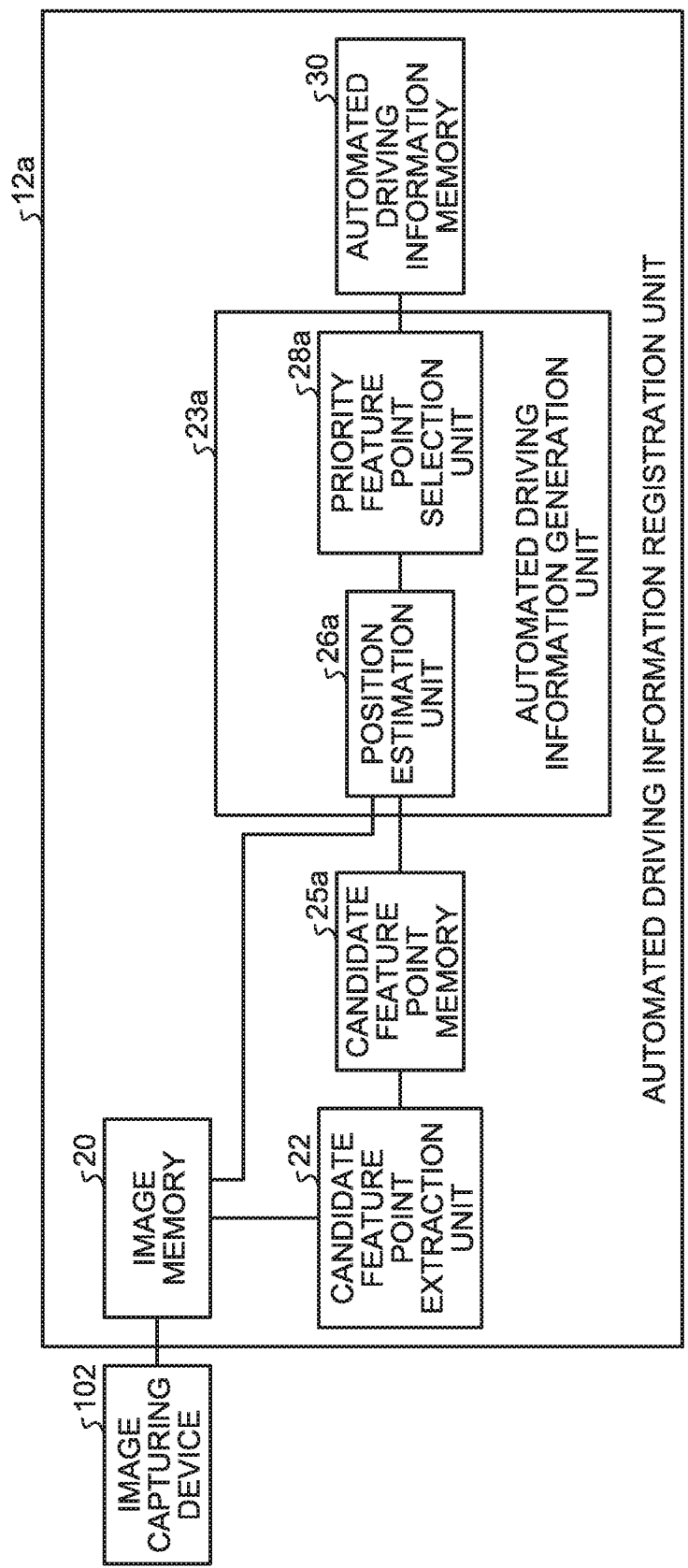
FIG. 11 is a schematic block diagram of an automated driving information registration unit according to a second embodiment.

FIG. 11 is a schematic block diagram of the automated driving information registration unit according to the second embodiment. As illustrated in FIG. 11, the automated driving information registration unit 12a according to the second embodiment includes the image memory 20, the candidate feature point extraction unit 22, a candidate feature point memory 25a, an automated driving information generation unit 23a, and the automated driving information memory 30.

The candidate feature point memory 25a stores the information regarding the candidate feature points F1 extracted by the candidate feature point extraction unit 22 (information regarding which part of the registration time image Pi1 is the candidate feature point F1).

The automated driving information generation unit 23a includes a position estimation unit 26a and a priority feature point selection unit 28a. The position estimation unit 26a calculates automated driving information α1a indicating information regarding the position (coordinate) of the feature point F2 relative to the origin coordinate C0 on the basis of the registration time images Pi1. In the first embodiment, the coordinate of only the feature point F2 that is selected by the feature point selection unit 24 is calculated; however, the position estimation unit 26a according to the second embodiment calculates the coordinates of all the candidate feature points F1 that are extracted by the candidate feature point extraction unit 22. The position estimation unit 26a calculates the coordinates of the candidate feature points F1 by a method similar to that of the first embodiment (bundle adjustment). As a result of calculating the coordinate, the position estimation unit 26a selects the feature point F2 that is determined to be a structure, that is, selects as the feature point F2, only the candidate feature point F1 whose position in the actual registration time image Pi1 satisfies the relation between the coordinate of the vehicle 1 and the coordinate of the candidate feature point F1 among the candidate feature points F1, and treats only the coordinate of the feature point F2 as the automated driving information α1a.

The priority feature point selection unit 28a selects the priority feature point F3 from the feature points F2 registered as the automated driving information α1 on the basis of at least one of the registration time image Pi1 and the automated driving information α1a. On the basis of the automated driving information α1a, the priority feature point selection unit 28a generates the priority automated driving information α2 indicating the information regarding the priority feature point F3 relative to the origin coordinate C0.

The automated driving control device 10a according to the second embodiment does not include the feature point selection unit 24; however, the position estimation unit 26a selects the feature point F2 that is determined to be a structure and calculates the coordinate. Therefore, in a manner similar to the first embodiment, the automated driving control device 10a can automatically park the own vehicle by the automated travel even if the positional relation between the own vehicle and the parking position cannot be detected from the parking line.

Third Embodiment

Next, a third embodiment will be described. An automated driving control device 10b according to the third embodiment is different from the first embodiment in that an automated driving information registration unit 12b does not include the priority feature point selection unit 28. Description of a part of the third embodiment that is common to the first embodiment is omitted.

Figure 12:
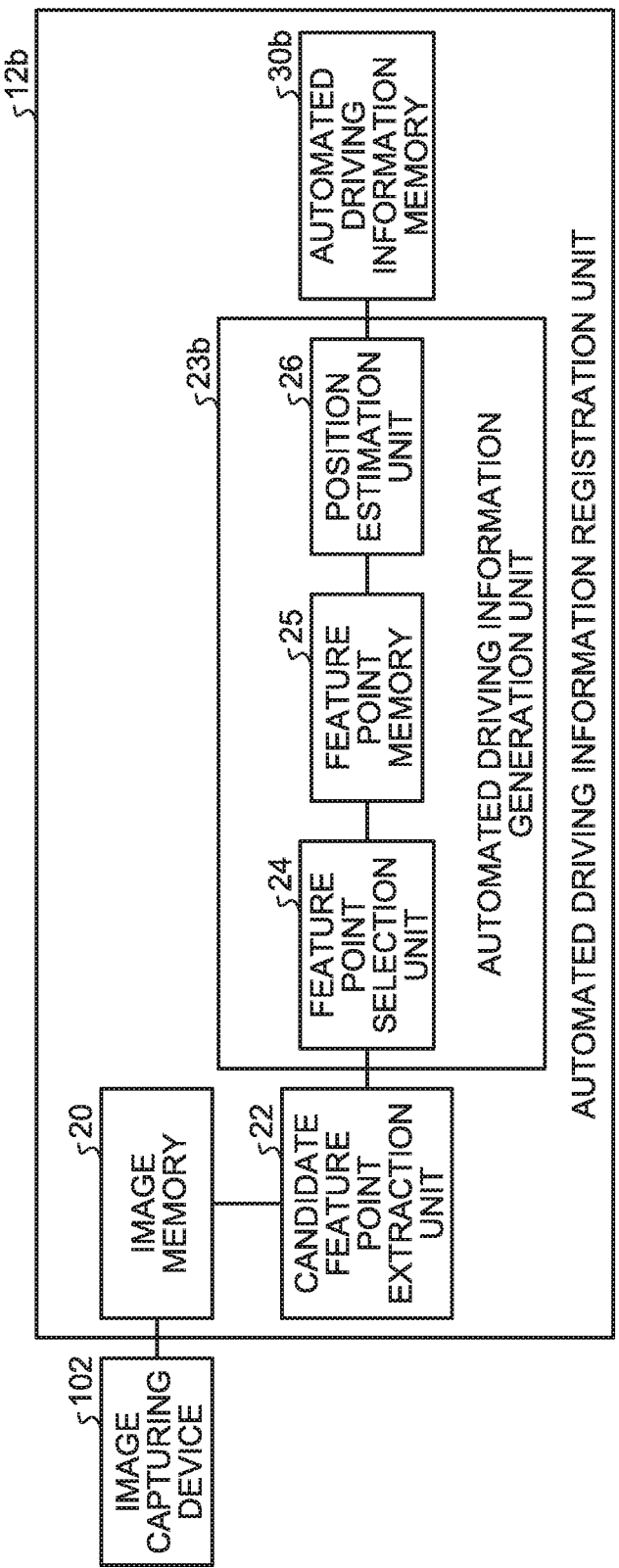
FIG. 12 is a schematic block diagram of an automated driving information registration unit according to a third embodiment.

FIG. 12 is a schematic block diagram of the automated driving information registration unit according to the third embodiment. As illustrated in FIG. 12, the automated driving information registration unit 12b according to the third embodiment includes the image memory 20, the candidate feature point extraction unit 22, the automated driving information generation unit 23b, and the automated driving information memory 30b.

The automated driving information generation unit 23b includes the feature point selection unit 24, the feature point memory 25, and the position estimation unit 26. The feature point selection unit 24, the feature point memory 25, and the position estimation unit 26 perform the process similar to that of the first embodiment to generate the automated driving information α1 indicating the coordinate information of the feature point F2. The automated driving information memory 30b stores the automated driving information α1 therein. The vehicle position calculation unit 44 according to the third embodiment calculates the vehicle position information α3 (the position of the vehicle 1 during the automated travel) from the automated driving information α1, that is, the coordinate information of the feature point F2, which is different from the first embodiment.

In the third embodiment, the position of the vehicle 1 during the automated travel is calculated from the coordinate information of the feature point F2 without selecting the priority feature point F3. Even in this case, the automated driving information generation unit 23b in the automated driving control device 10b selects a structure and calculates the coordinate; therefore, if the positional relation between the own vehicle and the parking position cannot be detected from the parking line, the parking can be performed automatically by the automated travel, similarly to the first embodiment.

Fourth Embodiment

Next, a fourth embodiment is described. An automated driving control device 10c according to the fourth embodiment is different from the first embodiment in that the feature point selection unit 24 and the priority feature point selection unit 28 are not included. Description of a part of the fourth embodiment that is common to the first embodiment is omitted.

Figure 13:
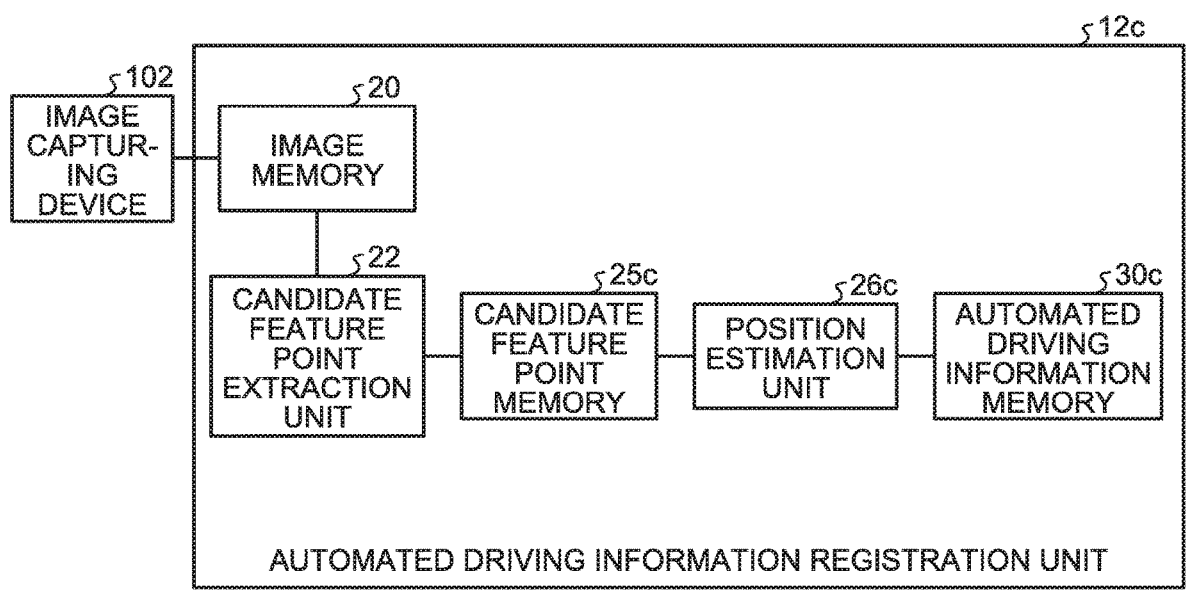
FIG. 13 is a schematic block diagram of an automated driving information registration unit according to a fourth embodiment.

FIG. 13 is a schematic block diagram of an automated driving information registration unit according to the fourth embodiment. As illustrated in FIG. 13, an automated driving information registration unit 12c according to the fourth embodiment includes the image memory 20, the candidate feature point extraction unit 22, a candidate feature point memory 25c, a position estimation unit 26c, and an automated driving information memory 30c.

The candidate feature point memory 25c stores the information regarding the candidate feature point F1 extracted by the candidate feature point extraction unit 22 (which part of the registration time image Pi1 is the candidate feature point F1).

The position estimation unit 26c corresponds to the automated driving information generation unit. The position estimation unit 26c calculates automated driving information α1c indicating information regarding the position (coordinate) of the feature point F2 relative to the origin coordinate C0 on the basis of the registration time images Pi1. The position estimation unit 26c calculates the coordinate of the candidate feature point F1 by a method (bundle adjustment) similar to that of the first embodiment. The position estimation unit 26c selects the feature point F2 that is determined to be a structure, that is, selects as the feature point F2, only the candidate feature point F1 whose position in the actual registration time image Pi1 satisfies the relation between the coordinate of the vehicle 1 and the coordinate of the candidate feature point F1 among the candidate feature points F1, and treats only the coordinate of the feature point F2 as the automated driving information α1c.

The automated driving information memory 30c stores the automated driving information α1c therein. The vehicle position calculation unit 44 according to the fourth embodiment calculates the vehicle position information α3 (the position of the vehicle 1 during the automated travel) from the automated driving information α1c, that is, the coordinate information of the feature point F2.

In the fourth embodiment, the automated driving information generation unit includes only the position estimation unit 26c. Even in this case, the automated driving information generation unit (position estimation unit 26c) in the automated driving control device 10c selects a structure and calculates the coordinate; therefore, if the positional relation between the own vehicle and the parking position cannot be detected from the parking line, the parking can be performed automatically by the automated travel, which is similar to the first embodiment.

The embodiments of the present invention have been described so far; however, the description of the embodiments does not limit the embodiments. The components in the above description include the component that is easily conceived by a person skilled in the art and that is substantially the same, that is, the components in the equivalent range. Moreover, the components in the above description can be combined with each other. In addition, the components can be variously omitted, replaced, or changed in a range not departing from the concept of the embodiments described above.

REFERENCE SIGNS LIST

1 Vehicle
10, 10a, 10b, 10c Automated driving control device
12, 12a, 12b, 12c Automated driving information registration unit
14 Automated driving control unit
20 Image memory
22 Candidate feature point extraction unit
23 Automated driving information generation unit
24 Feature point selection unit
25 Feature point memory
26 Position estimation unit
28 Priority feature point selection unit
30 Automated driving information memory
40 Image memory
42 Automated driving time feature point extraction unit
44 Vehicle position calculation unit
46 Target position setting unit
48 Automated travel route generation unit
50 Automated driving execution control unit
102 Image capturing device
104 Driving device
110 Wall
112 Block
114, 116 Column
118 Pedestrian
120 Mark
A1, A2, A3, A4, A5, A6, A7, A8, A9, A10 Edge part
C0 Origin coordinate
C1 Feature point coordinate
C2 Registration time vehicle coordinate
C3 Automated driving time vehicle coordinate
C3' Temporarily decided coordinate
C4 Target position coordinate
F1 Candidate feature point
F2 Feature point
F3 Priority feature point
F4 Automated driving time feature point
P0 Target position
P1, P2 Position
Pi1 Registration time image
Pi2 Automated driving time image
X, Y, Z Direction
α1 Automated driving information
α2 Priority automated driving information
α3 Vehicle position information
α4 Target position information

The invention claimed is:

1. An automated driving control device for a vehicle, the automated driving control device comprising:
a processor; and
a non-transitory computer-readable medium having stored thereon executable instructions that, when executed by the processor, cause the automated driving control device to function as:
an automated driving information registration unit configured to generate automated driving information used for driving the vehicle automatically in response to a first image obtained, at a time of registration, by capturing an environment around the vehicle in a registration mode in which the vehicle is driven by a driver; and
an automated driving control unit configured to automatically drive the vehicle in response to the automated driving information and a second image obtained, at a time of automated driving, by capturing the environment around the vehicle in an automated driving mode in which the vehicle is driven automatically,
wherein the automated driving information registration unit includes:
a candidate feature point extraction unit configured to extract candidate feature points existing in the environment around the vehicle in response to the first image; and
an automated driving information generation unit configured to select the candidate feature points that are determined to be structures fixed around a target position of the vehicle among the candidate feature points in response to a plurality of the first images captured while the vehicle moves, as feature points, and to generate the automated driving information indicating information regarding positions of the feature points relative to a predetermined origin coordinate,
wherein the automated driving control unit includes:
a vehicle position calculation unit configured to calculate vehicle position information indicating information regarding a position of the vehicle relative to the predetermined origin coordinate in response to the second image and the automated driving information; and
an automated driving execution control unit configured to automatically drive the vehicle to the target position in response to the vehicle position information,
wherein the automated driving information generation unit is configured to select, as the feature point with priority, among the candidate feature points, the candidate feature point existing in a plurality of the first images that are successive in time series such that the vehicle has moved by a longer distance while the plurality of the first images are captured.

2. The automated driving control device according to claim 1, wherein the automated driving control unit includes:

a target position setting unit configured to generate target position information indicating information regarding a position of the target position relative to the origin coordinate; and an automated travel route generator generation unit configured to generate an automated travel route to the target position in response to the vehicle position information and the target position information.

3. The automated driving control device according to claim 2, wherein the automated travel route generation unit is configured to update and generate the automated travel route every time the vehicle automatically travels a predetermined distance or every time a predetermined period passes.

4. A vehicle comprising the automated driving control device according to claim 1.

5. An automated driving control device for a vehicle, the automated driving control device comprising:

a processor; and a non-transitory computer-readable medium having stored thereon executable instructions that, when executed by the processor, cause the automated driving control device to function as:

an automated driving information registration unit configured to generate automated driving information used for driving the vehicle automatically in response to a first image obtained, at a time of registration, by capturing an environment around the vehicle in a registration mode in which the vehicle is driven by a driver; and an automated driving control unit configured to automatically drive the vehicle in response to the automated driving information and a second image obtained, at a time of automated driving, by capturing the environment around the vehicle in an automated driving mode in which the vehicle is driven automatically, wherein the automated driving information registration unit includes:

a candidate feature point extraction unit configured to extract candidate feature points existing in the environment around the vehicle in response to the first image; and an automated driving information generation unit configured to select the candidate feature points that are determined to be structures fixed around a target position of the vehicle among the candidate feature points in response to a plurality of the first images captured while the vehicle moves, as feature points, and to generate the automated driving information indicating information regarding positions of the feature points relative to a predetermined origin coordinate, wherein the automated driving control unit includes:

a vehicle position calculation unit configured to calculate vehicle position information indicating information regarding a position of the vehicle relative to the predetermined origin coordinate in response to the second image and the automated driving information; and an automated driving execution control unit configured to automatically drive the vehicle to the target position in response to the vehicle position information, wherein:

the automated driving information generation unit is configured to select the candidate feature point as the feature point, if a position of the candidate feature point in the first image satisfies a relation between the position of the candidate feature point and the position of the vehicle, the automated driving information generation unit includes:

a feature point selection unit configured to, in response to a plurality of the first images captured while the vehicle moves, select that candidate feature point as the feature point, if the position of the candidate feature point in the first image satisfies the relation between the position of the candidate feature point and the position of the vehicle; and a position estimation unit configured to, in response to more first images in number than the first images used by the feature point selection unit, calculate information regarding the position of the feature point, of which in the first image satisfies the relation between the position of the feature point and the position of the vehicle among the feature points, and to generate the automated driving information indicating the information regarding the position of the feature point that satisfies the relation, wherein:

the automated driving information generator generation unit includes a feature point selection unit configured to select the feature point captured in a plurality of the first images that are successive in time series such that the vehicle has moved by a longer distance while the plurality of the first images are captured as a priority feature point with priority, among the feature points, and generate priority automated driving information indicating position information of the priority feature point relative to the predetermined origin coordinate in response to the automated driving information; and the vehicle position calculation unit is configured to calculate the vehicle position information in response to the second image and the priority automated driving information.

6. A vehicle comprising the automated driving control device according to claim 5.

7. An automated driving control method for a vehicle, the automated driving control method comprising:

generating automated driving information used for driving the vehicle automatically in response to a first image obtained, at a time of registration, by capturing an environment around the vehicle in a registration mode in which the vehicle is driven by a driver; and automatically driving the vehicle in response to the automated driving information and a second image obtained, at a time of automated driving, by capturing the environment around the vehicle in an automated driving mode in which the vehicle is driven automatically, wherein the generating includes:

extracting candidate feature points existing in the environment around the vehicle in response to the first image;

selecting the candidate feature points that are determined to be structures fixed around a target position of the vehicle among the candidate feature points in response to a plurality of the first images captured while the vehicle moves, as feature points, and generating the automated driving information indicating information regarding positions of the feature points relative to a predetermined origin coordinate, wherein the automatically driving includes:

calculating vehicle position information indicating information regarding a position of the vehicle relative to the predetermined origin coordinate in response to the second image and the automated driving information; and automatically driving the vehicle to the target position in response to the vehicle position information, wherein the selecting the candidate feature points includes selecting, as the feature point with priority, among the candidate feature points, the candidate feature point existing in a plurality of the first images that are successive in time series such that the vehicle has moved by a longer distance while the plurality of the first images are captured.

* * * * *